United States Patent [19]

Schoeneberger et al.

[11] 4,120,137
[45] Oct. 17, 1978

[54] TINE BAR RETAINING DEVICE

[75] Inventors: Ernest A. Schoeneberger, Leola; Edward A. Blakeslee, New Holland, both of Pa.

[73] Assignee: Sperry Rand Corporation, New Holland, Pa.

[21] Appl. No.: 825,998

[22] Filed: Aug. 19, 1977

[51] Int. Cl.² .......................................... A10D 57/02
[52] U.S. Cl. ........................................ 56/226; 56/364
[58] Field of Search ............................... 56/219–227, 56/364

[56] References Cited

U.S. PATENT DOCUMENTS

| 41,071 | 1/1864 | Hunter | 56/222 |
|---|---|---|---|
| 895,147 | 8/1908 | Beal | 56/226 |
| 3,472,008 | 10/1969 | Hurlburt | 56/226 |
| 3,641,750 | 2/1972 | Scarnato et al. | 56/226 |
| 3,742,689 | 7/1973 | Barows et al. | 56/226 |

FOREIGN PATENT DOCUMENTS 187,332  10/1956  Austria ..................................... 56/220

OTHER PUBLICATIONS

Sperry New Holland, "Haybine® Mower Conditioner", publication #31047749-4-77, VPC, top photo, p. 3.

Primary Examiner—Louis G. Mancene
Assistant Examiner—Paul J. Hirsch
Attorney, Agent, or Firm—John B. Mitchell; Frank A. Seemar; Ralph D'Alessandro

[57] ABSTRACT

A cam operated rotating reel for use in a crop harvesting apparatus is generally described. Specifically, the disclosure is directed to such a reel having an improved mechanism thereon for selective lateral adjustment of a tine bar relative to its support bearings without limiting the normal rotational characteristics of the bar.

9 Claims, 4 Drawing Figures

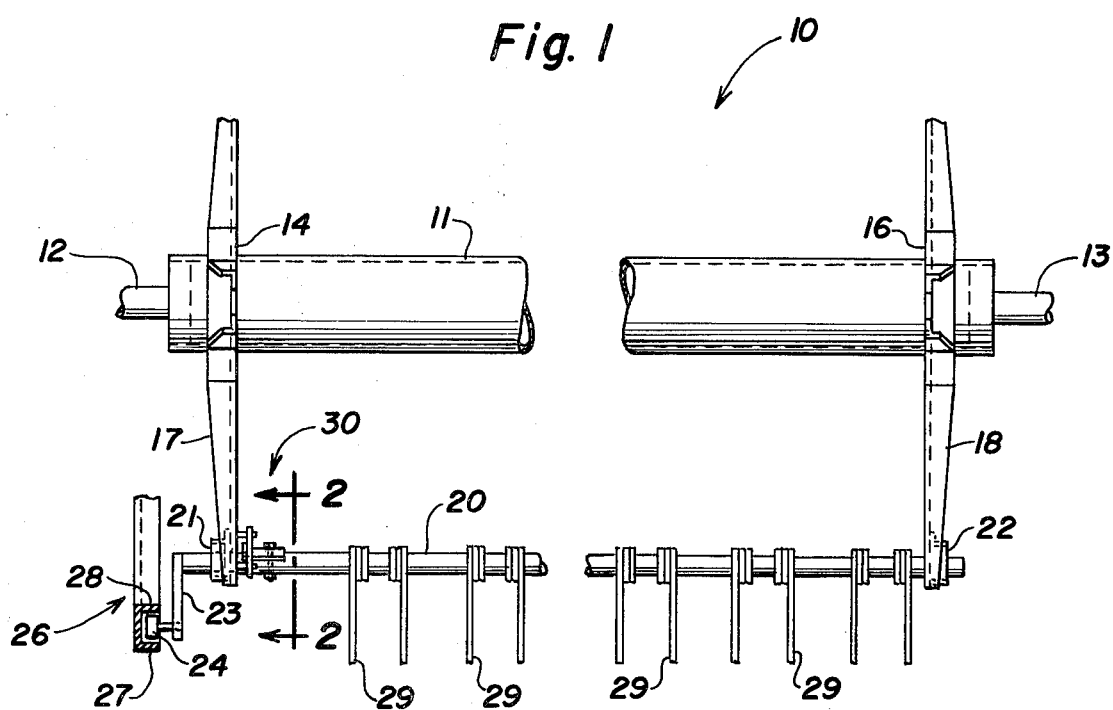
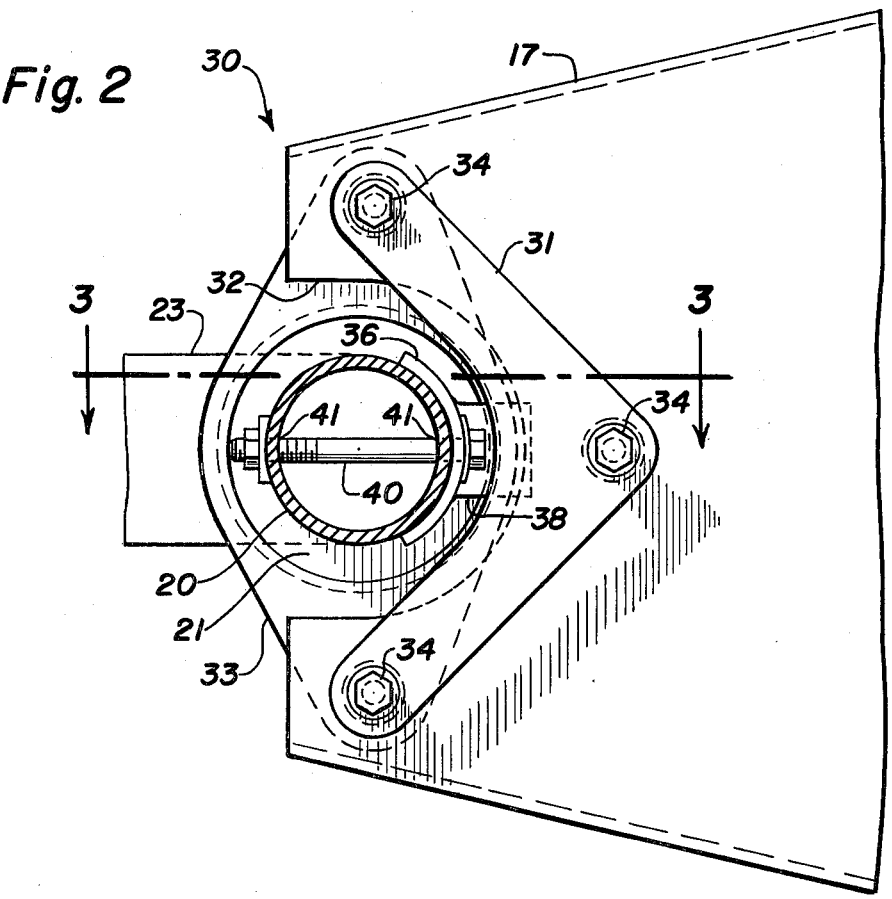

TINE BAR RETAINING DEVICE

BACKGROUND OF THE INVENTION

This invention is directed generally to harvester reels and specifically to a cam operated rotating reel with improved means thereon for selective lateral adjustment of the tine bars relative to their support bearings.

Certain types of crop harvesters employ a rotating reel at the forward end of the header to feed material into a mower and to rake the severed material rearwardly into conditioning rolls, or other crop manipulating mechanisms. The reel generally includes crop engaging fingers, or tines, affixed to elongate circumferentially spaced tine bars which are journalled in two or more laterally spaced support members fixed to the reel axis. Usually, though not necessarily always, the support members are spiders, with the tine bars journalled in each leg thereof. The attitude of the tines is controlled by a cam means which rocks the tine bars through a predetermined angle as the reel rotates.

The type of reel to which the instant invention is most applicable is well known in the prior art as exemplified in U.S. Pat. No. 3,472,008. Though intermediate supports may be used as required, the drawings of this patent show two laterally spaced spiders fixed to a common axis. Each leg of each spider terminates radially with a horizontally disposed bearing held in position by a bearing housing. Horizontal elongate tine bars extend through the aligned bearings in the spiders and are freely rotatable therein. Each tine bar carries a multiplicity of horizontally spaced tines fixed thereto for engagement with the crop material. An arm and cam follower is fixed to one end of each tine bar to be engaged with a channel-shaped closed loop cam on the interior surface of the reel housing.

As is common in reels of the type under consideration, the cam is constructed such that the tine bars, and thus the tines, rotate less than 360° relative to the support bearings as the reel rotates 360°. This relative rotation is advantageous in that it pulls the crops across the cutter bar in a continuous manner and provides improved feeding characteristics into the auger, or the nip of the conditioning rollers.

The cam structure, as readily seen in above-mentioned patent, comprises horizontal opposing camming surfaces forming a side opening into which the cam follower, or roller, is inserted. It should be readily apparent that integration of the reel structure into the housing is facilitated by some means for lateral adjustment of the tine bars relative to the support bearings. More specifically, during assembly lateral adjustment of the tine bars is necessary to ensure proper alignment between the cam follower and the cam surfaces. The means employed to make this adjustment must not interfere with the rotational characteristics of the tine bar relative to the bearings, but yet must be capable of selectively rigidly fixing its lateral location.

The prior art has employed various devices to accomplish the above-described adjustability. For example, U.S. Pat. No. 3,641,750 shows a pair of washer-like collars located on the tine bar and fixed thereto by set screws. Furthermore, each collar has one surface thereof engaged with a support bearing housing, thus maintaining a fixed distance between spiders. Besides the multiplicity of elements and the increased likelihood of misadjustment inherent therewith, such an arrangement adds an undesirable degree of complexity to the assembly operation.

Another prior art method of making the adjustment is to use a clamp which straddles the tine bar support bearing and the end of the spider and grips the bar on both sides thereof. The tine bar is laterally adjusted by loosening the clamp and sliding the bar endwise to its desired position and then retightening the clamp. Though effective, the adjustment clamp is exposed to crop materials and debris, and is thus potentially easily jammed. If the clamp cannot rotate about the end of the spider, the tine bar will also not be able to rotate and function properly.

Other methods employed in the prior art use various combinations of washers and cotter pins to, at best, provide inconvenient and awkward adjustment of the tine bar. The invention to be described in detail below is to a unique adjusting device which exhibits none of the shortcomings of the known prior art.

SUMMARY OF THE INVENTION

It is an object of the instant invention to provide a novel mechanism for the lateral adjustment of a tine bar relative to its support bearings.

It is another object of the instant invention to provide a lateral adjustment mechanism for a tine bar which does not interfere with the normal rotational operation of the bar.

It is another object of the instant invention to provide a mechanism for the lateral adjustment of the tine bar relative to its support bearings which is relatively compact and easily incorporated into the reel structure after assembly and installation of the tine bar.

It is a further object of the instant invention to provide a lateral adjustment mechanism for a tine bar which is simple of construction, inexpensive of manufacture, and extremely effective in use.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a partial front plan view of a harvester reel employing the adjustment mechanism of the instant invention;

FIG. 2 is an enlarged end view of the adjustment mechanism taken along line 2—2 of FIG. 1;

DESCRIPTION OF THE PREFERRED EMBODIMENT

Figure 3:
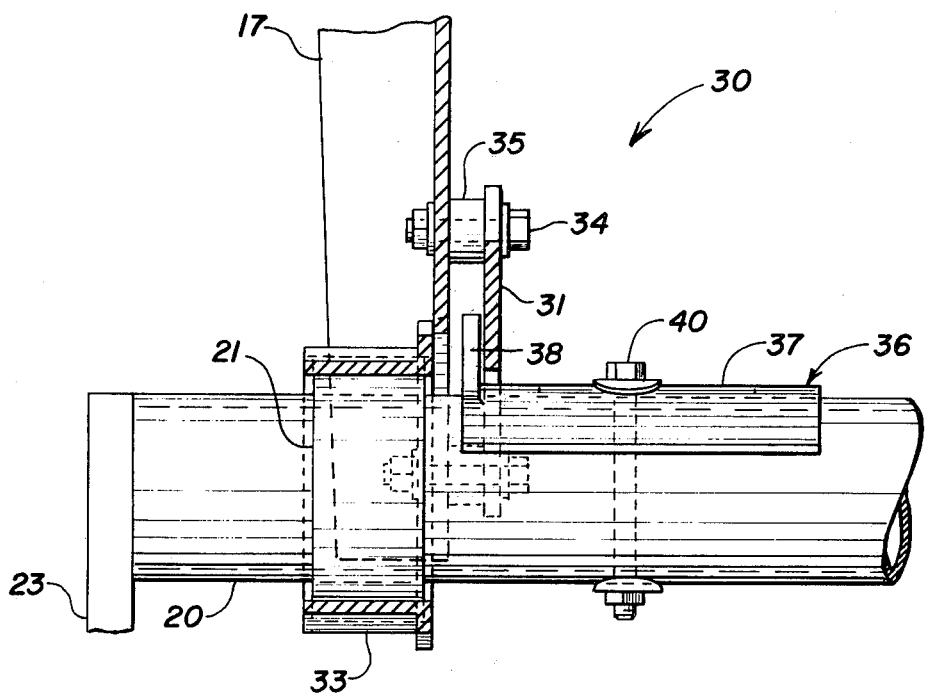
FIG. 3 is a side view of FIG. 2.

The general structure of the reel assembly employing the instant invention is well known in the art, as exemplified in U.S. Pat. Nos. 3,472,008 and 3,641,750. Briefly, reel assembly 10 (see FIG. 1) comprises a cylindrical tube 11 having stub shafts 12 and 13 fixed to and protruding from respective ends thereof. Shafts 12 and 13 provide the main axis of rotation of the reel assembly and rotational power is transmitted thereto through shaft 13 by means not shown. A pair of spiders 14 and 16 are fixed to tube 11 adjacent respective ends thereof. Each spider includes a multiplicity of radially extending legs, only one on each of which, 17 and 18, is shown in detail.

The legs on the spiders are horizontally aligned and a tine bar is positioned through each aligned grouping. Referring to FIG. 1 specifically, it can be seen that the elongate tine bar 20 extends through spider legs 17 and 18, and is rotatable relative thereto on support bearings 21 and 22. The support bearings are fixed to the spider legs, as explained further below, to provide a stable structure. An arm 23 is fixed to one end of tine bar 20, and, in known manner, supports a roller-type cam follower 24. A cam, 26, is formed by two opposing surfaces 27 and 28 which extend circumferentially about the primary axis of the reel in a closed loop pattern. As the reel rotates, follower 24 moves along the cam surfaces to rotate, or rock, tine bar 20 through a predetermined angle of less than 360° relative to the support bearings. Tines 29 are thereby caused to engage the crop materials and feed them into the auger or conditioning rollers as described above.

Assembly of the reel, whether during manufacture or subsequent repair, requires that the tine bar be laterally adjustable so that proper engagement between the cam and follower may be maintained. Adjustment mechanism 30, forming a major portion of the instant invention, may be easily manipulated for lateral movement of the tine bar, yet does not restrict the rotational characteristics of the bar.

In FIG. 1, mechanism 30 is shown to include elements fixed to tine bar 20 and elements fixed to spider leg 17. Each tine bar in the reel requires only one adjustment mechanism, but they need not all be associated with the same spider.

Figure 4:
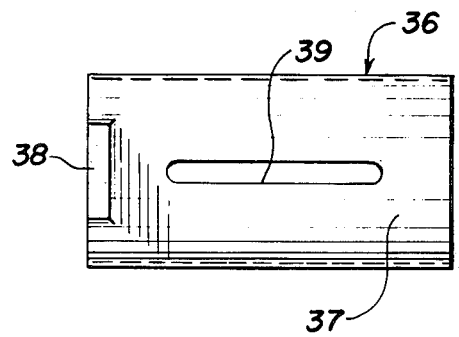
FIG. 4 is a top plan view of the clip of the instant invention.

Referring now to FIGS. 2 through 4, the detailed structure of the adjustment mechanism 30 can be seen to include a guide plate 31, a clip 36, and an elongate bolt 40. Though other arrangements would prove suitable, the end of spider leg 17 is shown to have a cut out portion 32 over which the bearing housing 33 is affixed. Support bearing 21 thus holds tine bar 20 against movement in any direction except lateral. Guide plate 31 is fixed to leg 17 by bolt 34 which may also hold bearing housing 33 in position. One edge of plate 31 is positioned adjacent tine bar 20 but spaced slightly away therefrom to allow clearance for clip 36. The edge nearest bar 20 is curved so that it is, for the most part, a constant distance from the bar. As best seen in FIG. 3, guide plate 31 is spaced from leg 17 by spacers 35 associated with each bolt 34, thus forming a channel between the plate and the adjacent surface of the spider leg. Clip 36 has a primary leg portion 37 which is curved to fit tine bar 20, and a bent tab 38 on one end thereof. Leg portion 37 has an elongate slot 39 therein through which bolt 40 extends. With bolt 40 fixed through slot 39 and a hole 41 through tine bar 20, the relative positioning between bar 20 and spider leg 17, or bearing 21, may be adjusted along slot 39 by selective engagement of the bolt. The tine bar is allowed to rotate, while maintaining the selected lateral relationship, by the radial movement of tab 38 within the channel between plate 31 and leg 17.

It will be understood that various changes in the details and arrangements of parts, which have herein been described and illustrated in order to explain the nature of the invention, will occur to and may be made by those skilled in the art upon a reading of the disclosure within the principles and scope of the invention.

For example, because of the extreme wear to which the elements will be subjected, it may be highly advantageous to harden some of the elements, such as guide plate 31. Along the same line, it may also prove advantageous to insert a harden plate adjacent to the leg 17 so that the channel within which tab 38 moves is defined by low-wear surfaces.

Having thus described the invention, what is claimed is:

1. In a crop harvesting apparatus of the type employing a cam operated rotating reel including rotatably and axially mounted and driven aligned spiders supporting, on respective aligned legs thereof, elongate tine bars journalled at respective support locations on each spider leg and movable laterally relative thereto, each said tine bar further including a cam follower on one end thereof for engagement with said cam to control the rotation of said tine bar relative to said spiders as they rotate 360° about the axis of said spiders, the improvement comprising:

a device for selective adjustment of the lateral position of each said tine bar relative to said spiders, said device including a guide plate fixed to, and spaced from a lateral side of one of said spiders adjacent the tine bar journal location thereon forming a channel therebetween at least partially radially about said location;

a bolt-sized orifice through said tine bar adjacent said side of said one spider;

a clip having a primary leg portion and a tab portion extending substantially perpendicularly away therefrom, said tab portion fitting in said channel, said leg portion having an elongate slot therethrough with the long axis thereof substantially parallel to the longitudinal axis of the tine bar; and a bolt extending through said slot and said orifice and fixed to said tine bar whereby said tine bar may be selectively laterally adjusted relative to said spiders, yet rotate relative thereto as required.

2. The harvesting apparatus of claim 1 wherein:
said leg portion of said clip has a longitudinal radius of curvature substantially equivalent to that of said tine bar whereby the two elements may fit together in intimate contact.

3. The harvesting apparatus of claim 2 further including:
a wear plate adjacent said spider substantially the same size as, and spaced from said guide plate such that said channel is between these two plates.

4. The harvesting apparatus of claim 3 wherein:
said wear plate and said guide plate are case hardened steel.

5. The harvesting apparatus of claim 4 wherein:
said channel extends about said location in a substantially constant radius arc of less than 360°.

6. The harvesting apparatus of claim 5 wherein:
said channel extends about said location in a substantially constant radius arc of less than 180°.

7. A cam-operated reel assembly for a harvester comprising:
at least two laterally spaced apart support members mounted for rotation about a common horizontal axis, said support members each having a multiplicity of horizontal bearings therethrough equally spaced angularly and radially about said common horizontal axis, the bearings of one support member in substantial horizontal alignment with respective bearings in the other, thus forming aligned groupings of bearings;
a multiplicity of elongate tine bars extending between and through said support members through respective groupings of said bearings and movable laterally and rotatably relative thereto, each said tine bar including an end-mounted cam follower;

a mechanism for selective lateral adjustment of each tine bar relative to said support members, each mechanism including a guide plate fixed to, and spaced from a lateral side of one of said support members adjacent one of said bearings forming a channel between said guide plate and said lateral side, said channel extending at least partially radially about said one bearing;

a clip having a primary leg portion and a tab portion extending substantially perpendicularly away therefrom, said tab portion fitting in said channel; and adjustable fixing means engaging said tine bar and said leg portion to selectively hold these elements together.

8. The reel assembly of claim 7 wherein:

said tine bar has a bolt-sized orifice therethrough adjacent said one bearing on said lateral side of said support member;

said leg portion has an elongate slot therethrough; and said adjustable fixing means comprises a bolt extending through said slot and said bolt-sized orifice and is fixed to said tine bar.

9. The reel assembly of claim 8 wherein:

said leg portion has a longitudinal radius of curvature substantially equivalent to that of said tine bar; and said channel extends about said one bearing in a substantially constant radius arc of approximately 180°.

* * * * *